US010275435B2

(12) United States Patent
Sevilmis et al.

(10) Patent No.: US 10,275,435 B2
(45) Date of Patent: Apr. 30, 2019

(54) CONSISTENT VIEWS OF PARTITIONED DATA IN EVENTUALLY CONSISTENT SYSTEMS

(71) Applicant: Microsoft Technology Licensing, LLC, Redmond, WA (US)

(72) Inventors: Tarkan Sevilmis, Redmond, WA (US); Arshish Kapadia, Issaquah, WA (US); Peter Adam Outcalt, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 175 days.

(21) Appl. No.: 14/308,429

(22) Filed: Jun. 18, 2014

(65) Prior Publication Data

US 2015/0370767 A1    Dec. 24, 2015

(51) Int. Cl.
*G06F 17/24*    (2006.01)
*G06F 17/30*    (2006.01)

(52) U.S. Cl.
CPC ........ *G06F 17/24* (2013.01); *G06F 17/30011* (2013.01); *G06F 17/3048* (2013.01); *G06F 17/30575* (2013.01)

(58) Field of Classification Search
CPC ..................................................... G06F 17/24
USPC ......................................................... 715/763
See application file for complete search history.

(56) References Cited

U.S. PATENT DOCUMENTS

| | | | | |
|---|---|---|---|---|
| 5,675,802 A | * | 10/1997 | Allen | G06F 8/71 707/999.202 |
| 5,805,889 A | * | 9/1998 | Van De Vanter | G06F 8/71 707/E17.005 |
| 5,806,078 A | * | 9/1998 | Hug | G06F 17/2288 707/999.202 |
| 6,006,239 A | * | 12/1999 | Bhansali | G06F 17/246 |
| 6,067,551 A | * | 5/2000 | Brown | G06Q 10/10 |
| 6,301,677 B1 | * | 10/2001 | Squibb | G06F 11/1469 711/112 |
| 6,523,032 B1 | * | 2/2003 | Sunkara | G06F 17/30445 |

(Continued)

OTHER PUBLICATIONS

"International Search Report & Written Opinion Received for PCT Application No. PCT/US2015/035907", dated Sep. 2, 2015, 13 Pages.

(Continued)

*Primary Examiner* — Reza Nabi

(57) ABSTRACT

A consistent user view system. The system incorporates any changes made by a user in any views shown to that user even when the changes have not propagated to the partitions supplying the view. The system separates the authority for edits from the replicated storage allowing efficient transactions and linear scalability. Documents are read from view-based partitions of a store. Document writes are written to a document-specific partition in a journal and applied to the store. The system stores a copy of pending changes in a user-specific partition. When a user requests a view, the system checks that user's cache for any pending changes applicable to the view. If any applicable changes are found, the changes are applied before showing the view to the user. Pending changes that have been successfully applied to the store are trimmed from the user-specific partition to free up resources.

18 Claims, 9 Drawing Sheets

(56) References Cited

U.S. PATENT DOCUMENTS

| | | | | |
|---|---|---|---|---|
| 6,647,474 B2* | 11/2003 | Yanai | G06F 3/0601 | 711/161 |
| 7,555,527 B1* | 6/2009 | Slaughter | H04L 45/02 | 345/536 |
| 7,765,186 B1* | 7/2010 | Hu | G06F 9/466 | 707/612 |
| 7,941,399 B2* | 5/2011 | Bailor | G06F 17/24 | 707/608 |
| 7,974,948 B2* | 7/2011 | Baer | G06F 17/30011 | 707/638 |
| 8,028,229 B2* | 9/2011 | Bailor | G06F 17/2288 | 715/255 |
| 8,073,812 B2* | 12/2011 | Curtis | G06Q 10/10 | 706/45 |
| 8,327,183 B2* | 12/2012 | Deguchi | G06F 11/1471 | 714/15 |
| 8,407,434 B2* | 3/2013 | Ogus | G06F 12/0888 | 711/104 |
| 8,413,045 B2* | 4/2013 | Lemonik | G06F 17/2247 | 715/234 |
| 8,453,052 B1* | 5/2013 | Newman | G06F 17/2211 | 715/255 |
| 8,468,132 B1* | 6/2013 | O'Neill | G06F 17/30212 | 707/622 |
| 8,566,284 B2* | 10/2013 | Hirakawa | G06F 11/2064 | 707/613 |
| 8,572,038 B2* | 10/2013 | Erofeev | H04L 29/0854 | 707/634 |
| 8,656,290 B1* | 2/2014 | Greenspan | G06F 3/0481 | 707/608 |
| 9,218,102 B1* | 12/2015 | Greenspan | G06F 3/0481 | |
| 2004/0210823 A1* | 10/2004 | Miura | G06F 17/30017 | 715/202 |
| 2005/0039116 A1* | 2/2005 | Slack-Smith | G06F 17/2288 | 715/255 |
| 2006/0129642 A1* | 6/2006 | Qian | G06F 17/30873 | 709/205 |
| 2006/0200755 A1* | 9/2006 | Melmon | H04L 67/1095 | 715/234 |
| 2006/0282479 A1* | 12/2006 | Johnson | G06F 8/65 | |
| 2007/0061702 A1* | 3/2007 | Letkeman | G06F 8/71 | 715/210 |
| 2007/0083574 A1* | 4/2007 | Garin, Jr. | G06F 17/30581 | |
| 2007/0233811 A1* | 10/2007 | Rochelle | G06F 17/246 | 709/219 |
| 2007/0250506 A1* | 10/2007 | Stevens | G06Q 10/10 | |
| 2008/0059539 A1* | 3/2008 | Chin | G06Q 10/10 | |
| 2008/0104140 A1* | 5/2008 | Vierich | G06F 8/71 | |
| 2008/0208869 A1* | 8/2008 | Van Riel | G06F 17/24 | |
| 2008/0208969 A1* | 8/2008 | Van Riel | G06F 17/30861 | 709/204 |
| 2009/0271806 A1* | 10/2009 | McDonald | G06F 9/543 | 719/329 |
| 2009/0313331 A1* | 12/2009 | Rasmussen | G06F 17/2288 | 709/205 |
| 2010/0070882 A1* | 3/2010 | Wang | G06F 17/24 | 715/753 |
| 2010/0083136 A1* | 4/2010 | Komine | G06F 9/52 | 715/753 |
| 2010/0095198 A1* | 4/2010 | Bultrowicz | G06F 17/241 | 715/234 |
| 2010/0106753 A1* | 4/2010 | Prabhakaran | G06F 17/30371 | 707/818 |
| 2010/0169269 A1* | 7/2010 | Chandrasekaran | G06F 17/30165 | 707/608 |
| 2010/0174863 A1* | 7/2010 | Cooper | G06F 17/30575 | 711/113 |
| 2010/0257457 A1* | 10/2010 | De Goes | G06Q 10/10 | 715/751 |
| 2011/0137862 A1* | 6/2011 | Kamimura | G06F 17/30581 | 707/624 |
| 2011/0161376 A1* | 6/2011 | Dickson | G06F 8/71 | 707/803 |
| 2012/0016849 A1* | 1/2012 | Garrod | G06F 17/30578 | 707/695 |
| 2012/0101980 A1* | 4/2012 | Taleghani | G06F 17/2288 | 707/608 |
| 2012/0110445 A1* | 5/2012 | Greenspan | G06F 17/2288 | 715/256 |
| 2013/0212250 A1* | 8/2013 | Kleppner | G06Q 10/10 | 709/224 |
| 2013/0218845 A1* | 8/2013 | Kleppner | G06F 17/24 | 707/687 |
| 2013/0262373 A1* | 10/2013 | Rampson | G06Q 10/10 | 707/608 |
| 2014/0164831 A1* | 6/2014 | Merriman | G06F 17/30578 | 714/20 |
| 2015/0370767 A1* | 12/2015 | Sevilmis | G06F 17/30575 | 715/255 |
| 2015/0370825 A1* | 12/2015 | Outcalt | G06F 17/30174 | 707/608 |
| 2015/0378972 A1* | 12/2015 | Kapadia | G06F 17/2288 | 715/229 |

OTHER PUBLICATIONS

Kaiser, et al., "Versioning and Consistency in Replica Systems", In International Conference on Frontiers of High Performance Computing and Networking, Dec. 4, 2006, 10 pages.

Saito, et al., "Optimistic Replication", In Journal of ACM Computing Surveys (CSUR), vol. 37 Issue 1, Mar. 2005, 40 pages.

Goel, et al., "View Consistency for Optimistic Replication", In Seventeenth IEEE Symposium on Reliable Distributed Systems, Oct. 20, 1998, 7 pages.

Baker, et al., "Megastore: Providing Scalable, Highly Available Storage for Interactive Services", In 5th Biennial Conference on Innovative Data Systems Research (CIDR), Jan. 9, 2011, 12 pages.

PCT International Preliminary Report on Patentability Issued in PCT Application No. PCT/US2015/035907, dated Aug. 4, 2016, 11 Pages.

"Second Written Opinion Issued in PCT Application No. PCT/US2015/035907", dated May 12, 2016, 10 Pages.

"Office Action Issued in European Patent Application No. 15733030.9" dated Jan. 29, 2018, 11 Pages.

"Summons to attend oral hearing Issued in European Patent Application No. 15733030.9", dated Jun. 26, 2018, 8 Pages.

Karwin, Bill, "Read/Write Splitting with MySQL and PHP", Retrieved from: https://www.percona.com/sites/default/files/presentations/Read%20Write%20Split.pdf, Jan. 23, 2013, 44 Pages.

* cited by examiner

CONSISTENT VIEWS OF PARTITIONED DATA IN EVENTUALLY CONSISTENT SYSTEMS

BACKGROUND

Large-scale services allow transactions across vast volumes of data and often maintain multiple replicas of data. The underlying resources have finite limits that restrict the amount of data that can be handled in any single transaction. As a result, large-scale services are typically designed with fixed scale units. When the load on a service exceeds the scale unit, additional scale units may be added and the data may be partitioned across multiple scale units. While this allows the service to accommodate increasing volumes of data, transactions can longer be performed across the data that has been partitioned.

Often the same data is replicated to more than one partition, for example, to allow that data to be viewed in different ways (e.g., by first name or by last name). Depending upon the design of the synchronization mechanisms used to reconcile the data, the changes may take some time to replicate to other partitions. This presents a particular problem in an eventually consistent large-scale service when a user edits data in one partition, saves the edited data, and receives confirmation that the data has been saved. While the data in each partition will eventually reflect the user's changes (i.e., eventual consistency), propagation delays present an undesirable situation where the changes may not appear to be present if the user subsequently pulls data from a replica before the partition has been updated with the changes. The apparent loss of the changes can be quite disconcerting to a user after receiving confirmation that the changes had been saved.

Conventional solutions to this problem include using load balancing schemes that direct the user to the same partition; however, load balancing becomes difficult when the partition experiences an outage or when partition roles require the user to access replicas on different partitions, which leads to load balancing becoming a scalability bottleneck.

It is with respect to these and other considerations that the present invention has been made. Although relatively specific problems have been discussed, it should be understood that the embodiments disclosed herein should not be limited to solving the specific problems identified in the background.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments of a consistent user view system include separate layers for handling write requests and read requests. A journal services write requests (e.g., writes to documents) in a partition scheme consistent with write actions. A store services read requests (i.e., reads of views) in a partition scheme consistent with read actions. The journal includes at least one document-based partition for storing documents. The store includes at least one view-based partition for storing documents. If a document is associated with more than one view, each view typically maintains its own copy of the document (i.e., a replica). The system also includes a user cache for storing records of changes made by users. The user cache is partitioned on a per-user basis and includes at least one user-specific partition for storing changes made by that user.

As users perform actions, such as creating, modifying, or deleting a document, a write request is communicated to the consistent user view system. Upon receipt, the consistent user view system may save the write request to the journal. In time, write requests saved to the journal are applied to the store. Changes to a document are considered to be accepted when saved to the journal. Acknowledgement of receipt may be provided to the user making the change after the write request has been saved to the journal or the user cache. The changes reflected in the write request are generally not visible to all users until they have been merged into the store; however, the user cache provides a mechanism for allowing the user making the changes and, in some embodiments, other users associated with the document being changed, to see the changes.

Upon receipt of a read request from a user, the view responsive to the read request is retrieved from the store and any responsive user view records are retrieved from the user-specific partition associated with the user who submitted the read request. The responsive view and the responsive user view records are merged on-the-fly and the changes to the document contained in the user view record are applied to the view to create an updated view for the user. Thus, even when the changes have not been fully applied to the store, views presented to the editor reflect the changes made by that editor and acknowledged by the consistent user view system. Because the consistent user view system applies the editor's changes to views shown to the editor, the editor sees the version of the document that the editor expects to see. This reduces or eliminates unnecessary confusion and concern experienced by editors who view recently edited documents before the changes have been applied to the store. Further, because the user view records are user-specific, changes made by one user are not visible to any other user until they have been applied to the store, or in some embodiments, to the user view cache. Once a write request has been successfully applied to the store, the user view record may be deleted from the user view cache.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems, or devices. Accordingly, embodiments may take the form of a hardware implementation, an entirely software implementation or an implementation combining software and hardware aspects. The following detailed description is, therefore, not to be taken in a limiting sense.

Embodiments of a consistent user view system are described herein and illustrated in the accompanying figures. The system incorporates any changes made by a user in any views shown to that user even when the changes have not propagated to the partitions supplying the view. The system separates the authority for edits from the replicated storage allowing efficient transactions and linear scalability. Documents are read from view-based partitions of a store. Document writes are written to a staging area and the changes are eventually applied to the store. The system stores a copy of pending changes in a user-specific partition. When a user requests a view, the system checks that user's cache for any pending changes applicable to the view. If any applicable changes are found, the changes are applied before showing the view to the user. Pending changes that have been successfully applied to the store are trimmed from the user-specific partition to free up resources.

Figure 1:
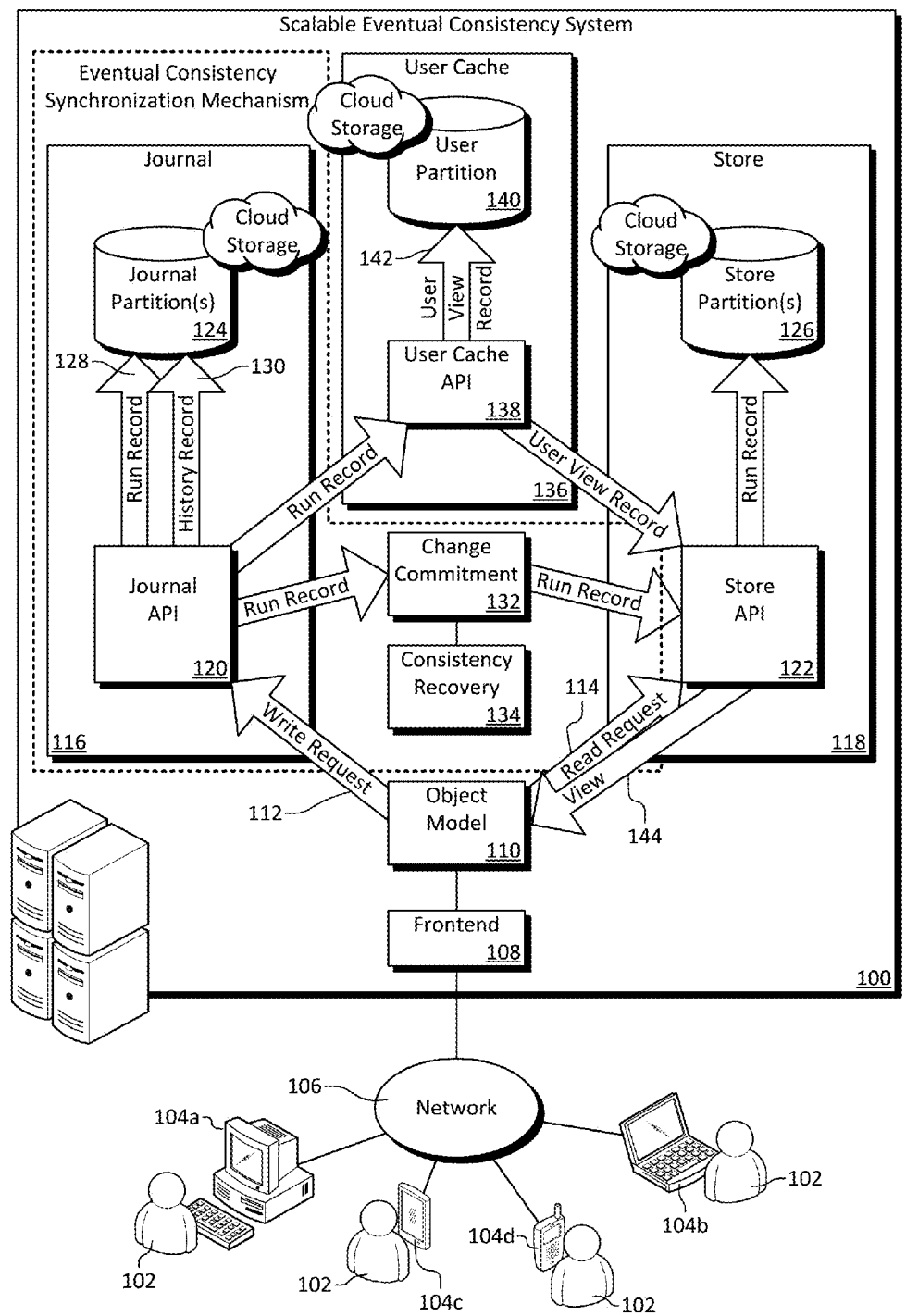
FIG. 1 illustrates a system architecture for one embodiment of the consistent view eventual consistency system.

FIG. 1 illustrates a system architecture for one embodiment of the consistent user view system. The consistent user view system 100 may be implemented in a large-scale (i.e., Big Data) service that provides access to and storage of vast amounts of information to users 102. Users may access the large-scale service from a variety of client devices 104a-d via a network 106, such as, but not limited to, the Internet, wide area networks, local area networks, and combinations thereof. Examples of suitable client devices include, but are not limited to, desktop computers 104a, laptop computers 104b, tablet computers 104c, mobile phones 104d, personal digital assistants, smartwatches, and smart appliances (e.g., smart televisions).

The consistent user view system 100 includes a frontend layer 108 providing an entry point to the large-scale service. In various embodiments, the large-scale service may provide a web-based user interface that is accessible to client devices 104a-d through a user agent, such as, a browser. In some embodiments, the user agent may be a dedicated client application that provides the user interface and handles communications with the large-scale service.

A transactional object model 110 allows efficient and scalable eventual consistency for the large-scale service. Transactions handled by the consistent user view system 100 include, without limitation, write requests 112 and read requests 114, allowing users to read, view (i.e., display), create, copy, delete, manipulate (i.e., edit or modify), share, collaborate, or save (i.e., write) documents and views handled by the large-scale service. The term "document" broadly encompasses any data object handled by the large-scale service. By way of example, for an office or productivity application-based large scale service, documents may include, without limitation, word processing documents, mail items, task items, calendar items, contact items, presentations, spreadsheets, or databases. The term "view" broadly encompasses any index, grouping, or categorization of documents based on a common property value used to present documents to a user. By way of example, views may allow a collection of task items to be displayed by the task owner or by the project with which the task is associated.

Within the consistent user view system 100, write requests 112 and read requests 114 are handled by separate layers. A journal 116 services write requests (e.g., writes to documents) in a partition scheme consistent with write actions. A store 118 services read requests 114 (i.e., reads of views) in a partition scheme consistent with read actions. In the illustrated embodiment, the journal 116 and the store 118 are represented as a virtualized storage resource (e.g., cloud storage) accessed through corresponding application programming interfaces (APIs), the journal API 120 and the store API 122.

The journal 116 includes at least one document-based partition 124 for storing documents. Each partition is sized based on the largest group of data assigned to a single resource or query. As the amount of data handled by the large-scale service increases, the journal 116 may be linearly scaled and new partitions added. Regardless of the number of journal partitions, the consistent user view system 100 stores all write requests 112 associated with any given document in the same journal partition. Having a single journal partition associated with each document allows a transactional edit queue to be maintained for each document.

The store 118 includes at least one view-based partition 126 for storing documents. Partitioning the store 118 by view allows documents to be efficiently accessed according to different criteria (e.g., tasks by project or owner and contacts by first name, last name, company, division, or location). If a document is associated with more than one view, each view typically maintains its own copy of the document (i.e., a replica). As with the journal 116, the store 118 may be linearly scaled and new partitions added to handle additional documents or views.

As users perform actions, such as creating, modifying, or deleting a document, a write request 112 is communicated to the consistent user view system 100. Upon receipt, the consistent user view system 100 first saves the write request 112 to the journal 116. Changes to a document are considered to be accepted when saved to the journal 116, but are generally not visible to all users until they have been merged into the store. When the journal 116 includes multiple partitions, the consistent user view system 100 may determine a partition identifier indicating the partition to which the write request 112 should be written. In various embodiments, the partition identifier may be based on a document identifier for the document associated with the write request 112.

The consistent user view system 100 may use the journal 116 as a staging area for holding write requests 112 until the changes have been applied to store 118. Applying the changes or the edit to the store 118 refers to applying an edit made to an offline copy of the source document to the source document in the store 118, including any and all replicas of the source document, or otherwise merging the changes into the appropriate views. The source document refers to the document read from the store 118 by the user. The journal 116 may also be used when detect conflicting edits to a document. To accomplish these functions, embodiments of the consistent user view system 100 may save the write request 112 to the journal 116 at least twice upon receipt. One copy of the write request 112 may be saved as a run record 128 that serves as an action item identifying a write request 112 that has not been fully merged with the store 118. The inability to fully apply a write request 112 to the store 118 may be the result of the temporary inaccessibility (e.g., resource failure or downtime) of the partitions or the communications channels (e.g., Internet) between the journal 116 and the store 118. Another copy of the write request 112 may be saved as history record 130. The history records may be used for purposes such as detecting conflict edits to a document or maintaining audit logs.

A change commitment layer 132 is responsible for applying the edits reflected in write requests 112 to the store 118. In various embodiments, document writes flow from the journal 116 to the store 118 so there are no complicated synchronization mechanisms. In various embodiments, the consistent user view system 100 may make a first attempt to apply run records to the store 118 as they are created in the journal 116. Once a run record has been successfully applied, the run record is deleted from the journal 116.

A consistency recovery layer 134 is responsible for cycling operation of the change commitment layer 132 and ultimately providing eventual consistency. The consistency recovery layer 134 prompts the change commitment layer 132 to read through the existing records maintained by in the journal 116 and to apply any unapplied edits from run records appearing in the journal 116 to the store 118. The change commitment layer 132 begins with the oldest run records to make transactional edits to documents in the order that the edits were received by the consistent user view system 100. The consistency recovery layer 134 may initiate operation of the change commitment layer 132 based on the occurrence of various events and/or on a periodic basis (e.g., every N minutes, hours, or days). Examples of events that may be used to trigger operation of the change commitment layer 132 include, but are not limited to, system startup, error recovery, and receiving a write request 112.

The system also includes a user cache 136 for storing records of changes made users. The user cache 136 is partitioned on a per-user basis and includes at least one user-specific partition 140 for storing changes made by that user. After being stored in the journal 116, write requests 112 are also written to a user-specific partition 140 associated with the user making the changes. The user cache 136 serves as a record of pending edits to a document. When a user views a document modified by that user, any pending edits associated with that document found in the user cache 136 are merged with that document in the view presented to the user. Thus, even if the changes have not been fully applied to the store 118 and all replicas updated, users will see any pending edits they have made. In various embodiments, other affected users may also be able to see pending edits to a document. Embodiments of the user cache 136 may be queried for user view records applicable to the document being viewed (i.e., the offline copy of a document) allowing clients to update the cached view of the data with the information that has changed (i.e., the edit) without having to reload the entire document.

In the illustrated embodiment, the user cache 136 is represented as a virtualized storage resource (e.g., cloud storage) accessed through a user cache API 138. Although illustrated as a separate resource, the user cache 136 may be implemented as part of the journal 116 or the store 118 by some embodiments of the system 100. In other words, the journal 116 may include both the document-based partitions and the user-specific partitions or the store 118 may include both the view-based partitions and the user-specific partitions.

The illustrated embodiment of FIG. 1, and described in relation thereto, is not intended to limit the consistent user view system 100 to any particular system architecture or implementation. The functionality of the user cache 136 may also be provided in other eventual consistency systems known to those skilled in the art, for example, an eventual consistency system implementing another synchronization mechanism, such as a PAXOS-based system. Such alternate eventual consistency systems may handle both read requests 114 and write requests 112 through the store 118 (i.e., the primary data storage system), may not maintain or utilize run records or history records, may omit or replace selected components, such as the journal 116, the change commitment layer 132, and the consistency recovery layer 134, or may add addition components as desired or required.

Figure 2A:
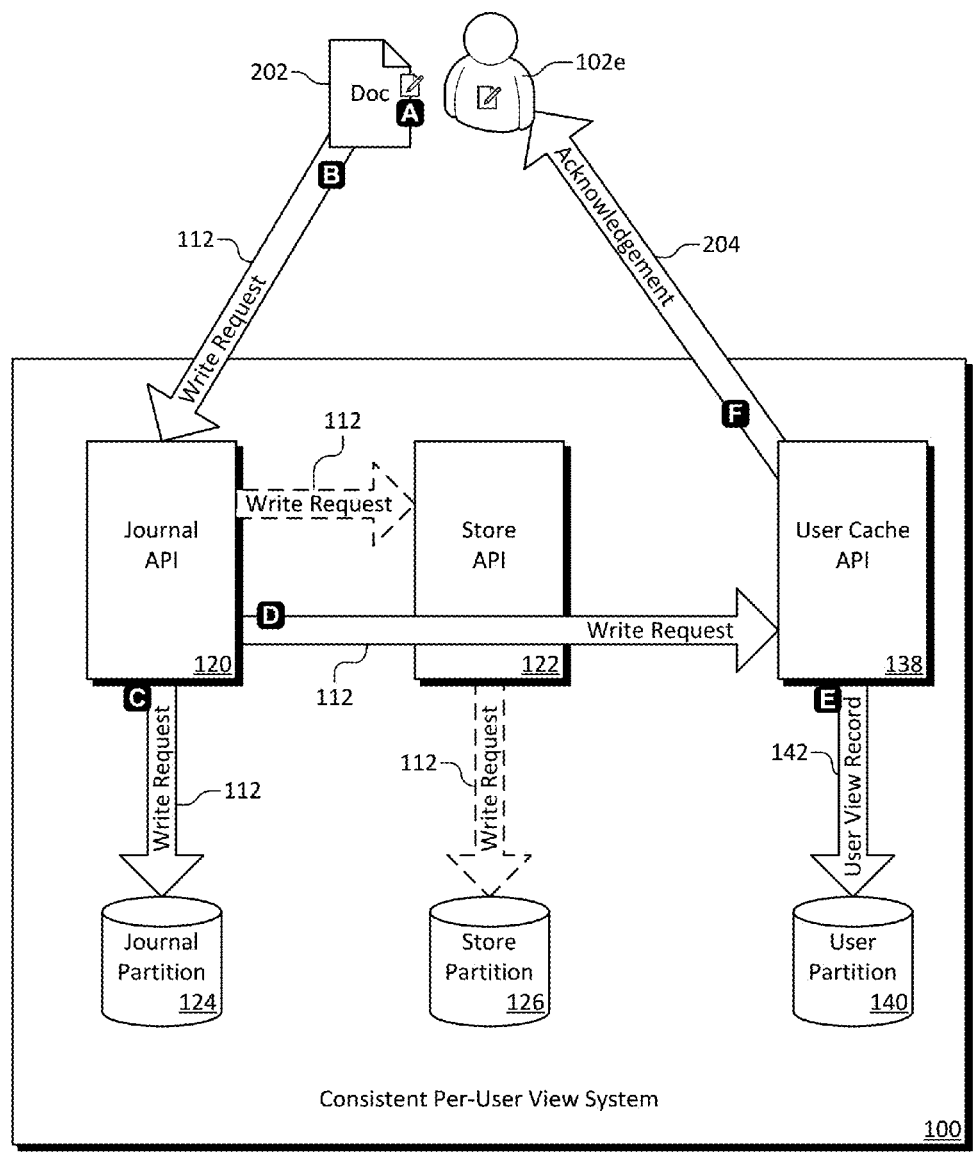
FIG. 2A is a flow diagram of a write request in one embodiment of the consistent user view system.

FIG. 2A is a flow diagram of a write request 112 in per-user embodiment of the consistent user view system. Flow begins at A with a user 102e editing a document 202. The document may be a new document created by the user or an existing document that has been read from the large-scale service (i.e., an offline copy). When the user saves the changes to the document, flow continues at B with the creation of a write request 112. The write request 112 may contain the changed document and additional information, such as, but no limited to, a user identifier of the user submitting the write request 112, the date the write request 112 was submitted, the time the write request 112 was submitted, and the version of a document that was read from the store 118 (i.e., the baseline version of the offline copy). The write request 112 is received by the consistent user view system 100 where it is processed. At C, a record based on the write request 112 is stored using the journal API. In various embodiments, the run records and history records described herein may be created at this time. At flow D, the write request 112 is sent to the user cache 136 where, at flow E, a user view record 142 based on the write request 112 is stored using the user cache API 138. The user-specific partition 140 where the user view record is stored may be based on a user identifier included in the write request 112. Upon storing the user view record, at flow F, the consistent user view system 100 sends an acknowledgement 204 to the user. The acknowledgment indicates to the user that the changes to the document have been received and accepted.

Acknowledgement of receipt may be provided to the user making the change after the write request 112 has been saved to the journal 116. An expectation that the changes have been saved is created when a user receives the acknowledgement. Further, users may also expect to see the saved changes reflected any time they view the document after receiving the acknowledgement. A user attempting to view the modified document after receiving acknowledgement and not seeing the changes is likely to be concerned. In an eventually consistent system, such concern may unfounded if, for example, the changes have been saved to journal 116. Because of the potential for a delay between the time the write request is saved to the journal 116 and the user cache, embodiments of the system may defer the acknowledgement until the write request 112 has been saved to the user cache, as in the illustrated embodiment. Waiting to acknowledge receipt until to the write request 112 has been saved to the user cache 136 reduces the likelihood that user expectations will go unfulfilled.

In normal operation, the consistent user view system 100 should eventually apply the changes in the write request 112 to the corresponding documents in the store 118. Updating the store 118 typically occurs at some time after the acknowledgement of the changes has been sent to the user. The amount of time until a write request 112 is fully applied in an eventually consistent system may be influenced by factors such as propagation delays and communication or resource outages. The flow diagram of FIG. 2A intentionally stops short of applying the write request 112 to the store 118 to represent a point where the user's changes to a document have been received and saved but where some or all of the replicas of that document have not been updated. The incomplete application of write requests 112 is represented by the write requests 112 to and from the store API 122 depicted using broken lines.

Flow continues at L as the consistency recovery layer 134 reads run records from the journal 116 and forms a queue. At flow M, the queued run records are sent to the change commitment layer 132 for processing in the order they were received. The queue is processed starting to flow H for each run record in the queue.

Figure 2B:
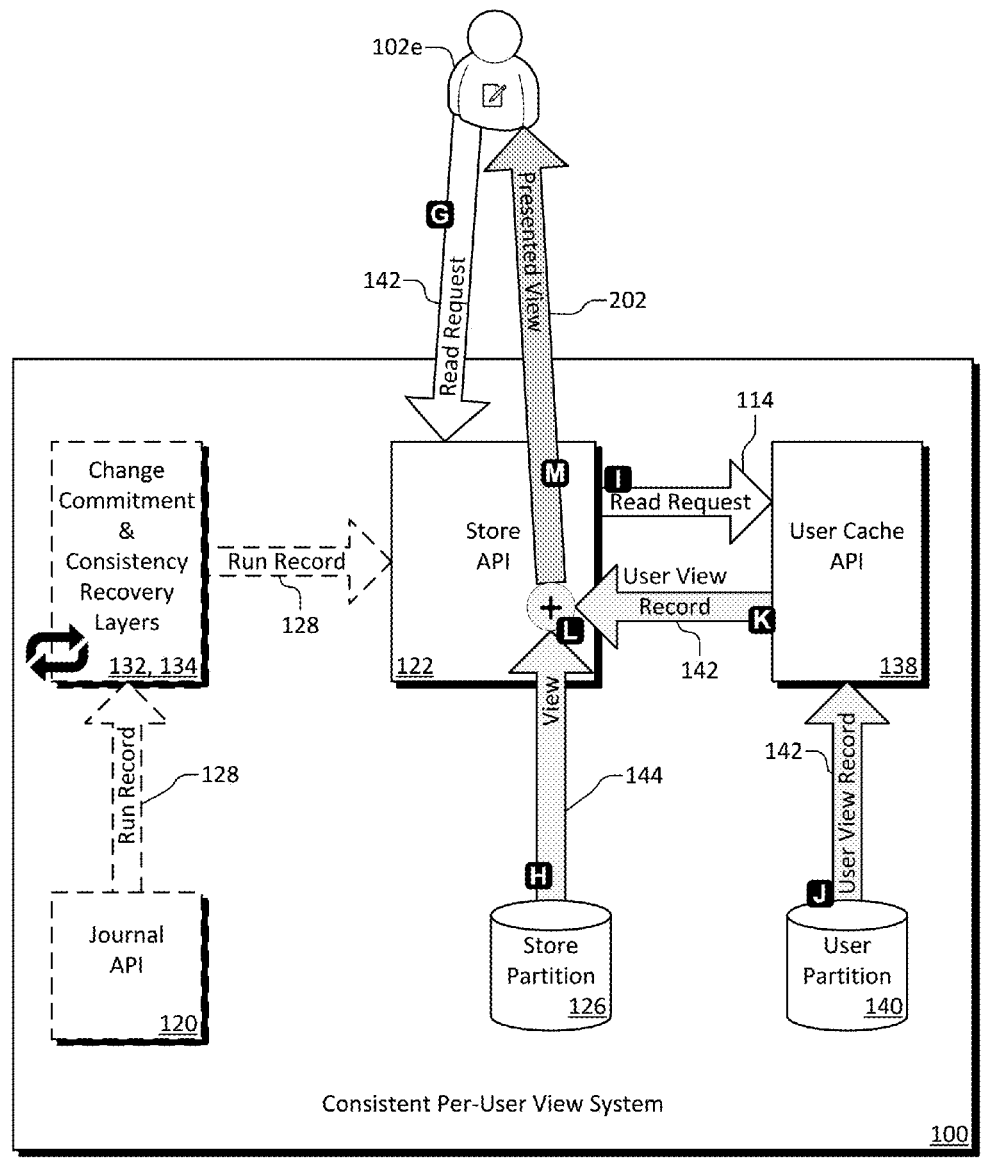
FIG. 2B is a flow diagram of a read request returning a document with pending changes that were made by the user who submitted the read request in one embodiment of the consistent user view system.

FIG. 2B is a flow diagram of a read request returning a document with pending changes that were made by the user who submitted the read request in one embodiment of the consistent user view system 100. Any user who made changes to a document responsive to a read request 114 may be referred to as an editor and any user who has not made changes to a document responsive to a read request 114 may be referred to as a viewer. Such user labels are used only to conveniently distinguish between different users and are not intended to imply any substantive difference in roles, privileges, or other characteristics of the users.

Flow begins at G when the editor 102e attempts to view the document 202 that was recently edited by the user, which triggers generation of a read request 114. The read request 114 is received by the consistent user view system 100 where it is serviced by the store 118. At flow H, the store API retrieves a view from the view partition based on the read request 114. Examples of the types of views that may be returned include a collection of documents (e.g., a task list) or a specific document (e.g., a task item). Each view may have its own replica of the document. For example, one replica of a task may appear in a list of tasks associated with a project that is stored in a task view partition in the store 118. Another replica of that task may be stored in a task owner view partition. The state of the replicas is that described in reference to FIG. 2A. In other words, the replicas have not been updated. For example, the journal 116 and the user cache 136 may contain version 2.1 of the document while the replicas in the store 118 are still at version 2.0.

Flow continues at flow I as the store 118 passes the read request 114 to the user cache. The contents of the user-specific partition 140 associated with the editor are read to locate any documents that are responsive to the read request 114 at flow J. The user-specific partition 140 may be selected based on a user identifier indicating the user who submitted the read request 114. In this scenario, the document that was recently edited is responsive to the read request 114 and the user who submitted the read request 114 is a recent editor of the document. The user cache 136 returns one or more responsive user view records associated with the responsive document from the editor's user-specific partition 140 at flow K.

The responsive view obtained at flow H and the responsive user view records I obtained at flow K are merged on-the-fly at flow L and the changes to the document contained in the user view record are applied to the view to create an updated view for presentation to the editor (i.e., a presented view 202). For example, in a task list view, the view may be updated to reflect the version of the task item in the user view record. In a document view, the content of the task item may be updated with the changes in user view record. When more than one responsive user view record is returned, the responsive user view records are merged in the order received. The presented view is returned to the editor at flow M.

Thus, even when the changes have not been fully applied, views presented to the editor reflect the changes made by that editor and acknowledged by the consistent user view system 100. Because the consistent user view system 100 applies the editor's changes to views shown to the editor, the editor sees the version of the document that the editor expects to see. This reduces or eliminates unnecessary confusion and concern experienced by editors who view recently edited documents before the changes have been applied to the store 118.

The journal 116, the change commitment layer 132, the consistency recovery layer 134, and the run record being propagated are depicted using broken lines to represent that the consistent user view system 100 is working toward eventual consistency.

Figure 2C:
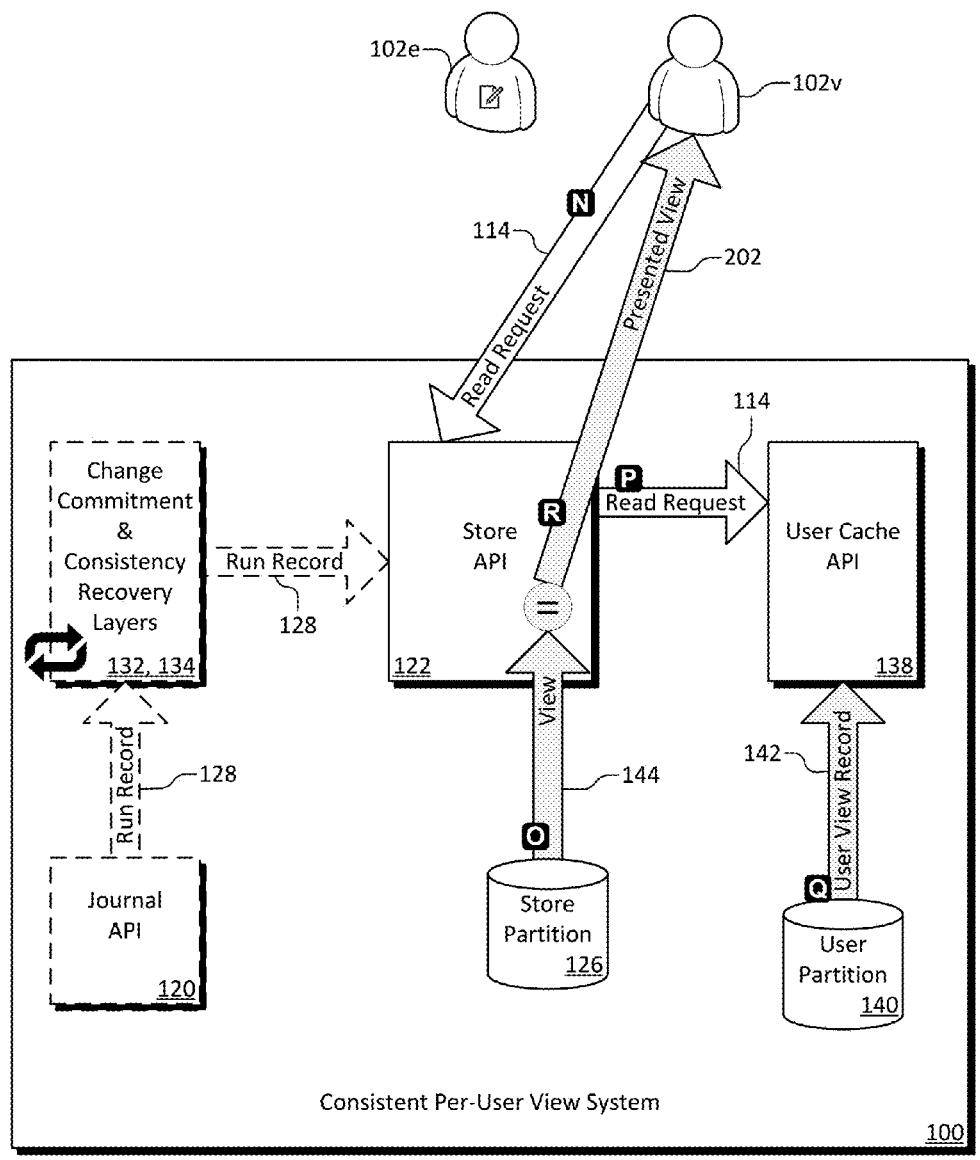
FIG. 2C is a flow diagram of a read request returning a document with pending changes that were made by a different user than the one who submitted the read query in one embodiment of the consistent user view system.

FIG. 2C is a flow diagram of a read request 114 returning a document with pending changes that were made by a different user than the one who submitted the read request 114 in the per-user embodiment of the consistent user view system. Flows N through Q generally correspond to flows G through J, as described in relation to FIG. 2B. There is no flow corresponding to flow K because the read request 114 (flow N) was submitted by a viewer 102v rather than the editor 102e. Accordingly, there is no user view record responsive to the read request 114 to return. It should be appreciated that the viewer may have a user-specific partition 140 containing user view records corresponding to pending changes to other documents. Alternatively, the viewer may not have any pending changes and not have a user-specific partition 140 allocated at this time. Flow continues at R with the presented view 202 being shown to the user. In this instance, the presented view is the view 144 retrieved from the store 118 and does not contain changes made by other editors. In general, it would not be practicable or efficient to search through all pending changes for every read request 114 and apply updates on-the-fly to requests made by any viewer. In contrast to editors, viewers are unlikely to be concerned by the absence of pending changes to the document because viewers are unlikely to be aware that pending changes exist.

Figure 2D:
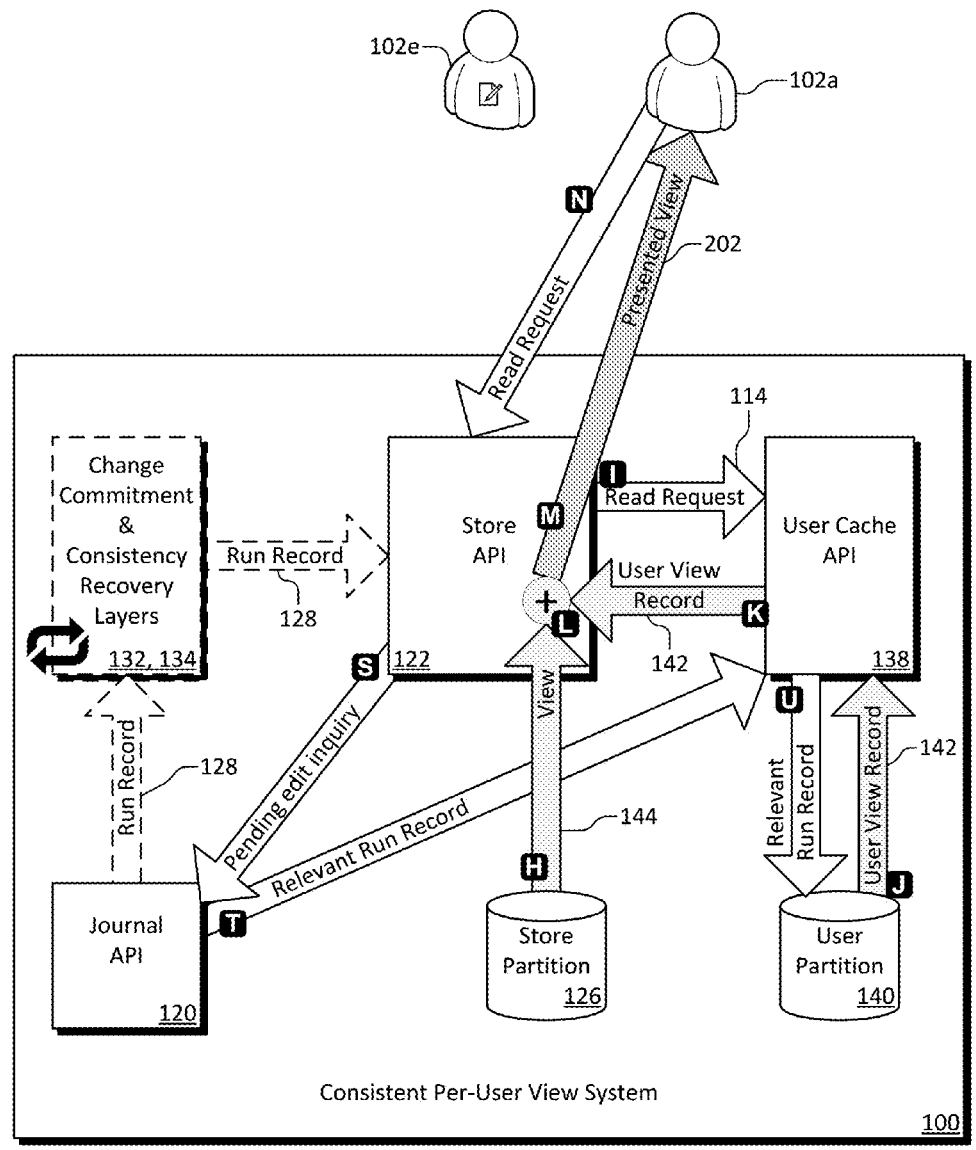
FIG. 2D is a flow diagram of a read request returning a document with pending changes that were made by a different user than the one who submitted the read query in an alternate embodiment of the consistent user view system.

FIG. 2D is a flow diagram of a read request 114 returning a document with pending changes that were made by a different user than the one who submitted the read request 114 in another embodiment of the consistent user view system. Flows H through K are as described in relation to FIG. 2B. Once again, as in FIG. 2C, the read request 114 (flow N) is submitted by a user 102a other than the editor 102e. A pending edit inquiry is made to the journal 116 at flow S. The pending edit inquiry is based on the read request 114. In response to the pending edit inquiry, a determination is made the user is affected by a pending edit, and sends a copy of the relevant run record to the user cache 136 at flow T. The relevant run record is added to the user-specific partition 140 for the affected user at flow U. This may occur for any number of affected users.

An affected user is generally any user who accesses a view that has a pending edit before the edit has been fully applied to all associated views. In other words, the affected user is one who views one replica of a source document having a pending edit before all replicas of the source document have been updated. For example, the affected user may access a contact using view based on the contact's last name. That contact may be subject to a pending edit made by another user, for example, a telephone number change. In one scenario, the replica of the contact from the last name view may have been updated with the telephone number change, but replica of the contact from the company view may not yet be updated. The reverse scenario, where the user initially requests the contact from the company view, is also possible. In either scenario, if the affected user were to access the replica of the contact from the other view, the information presented in the two views would be inconsistent.

By adding the user view record to the user-specific partition 140 for the affected user, the operation of the consistent user view system 100 with respect to the affected user is effectively the same as the operation of the consistent user view system 100 for the editor, as represented by flows H through L described in relation to FIG. 2B for a read request made by the editor. In various embodiments, flow H may run concurrently with flows S through U, and flows I through M may follow flow U. In this manner, consistent views, reflecting any pending changes, are presented to affected users.

Figure 3:
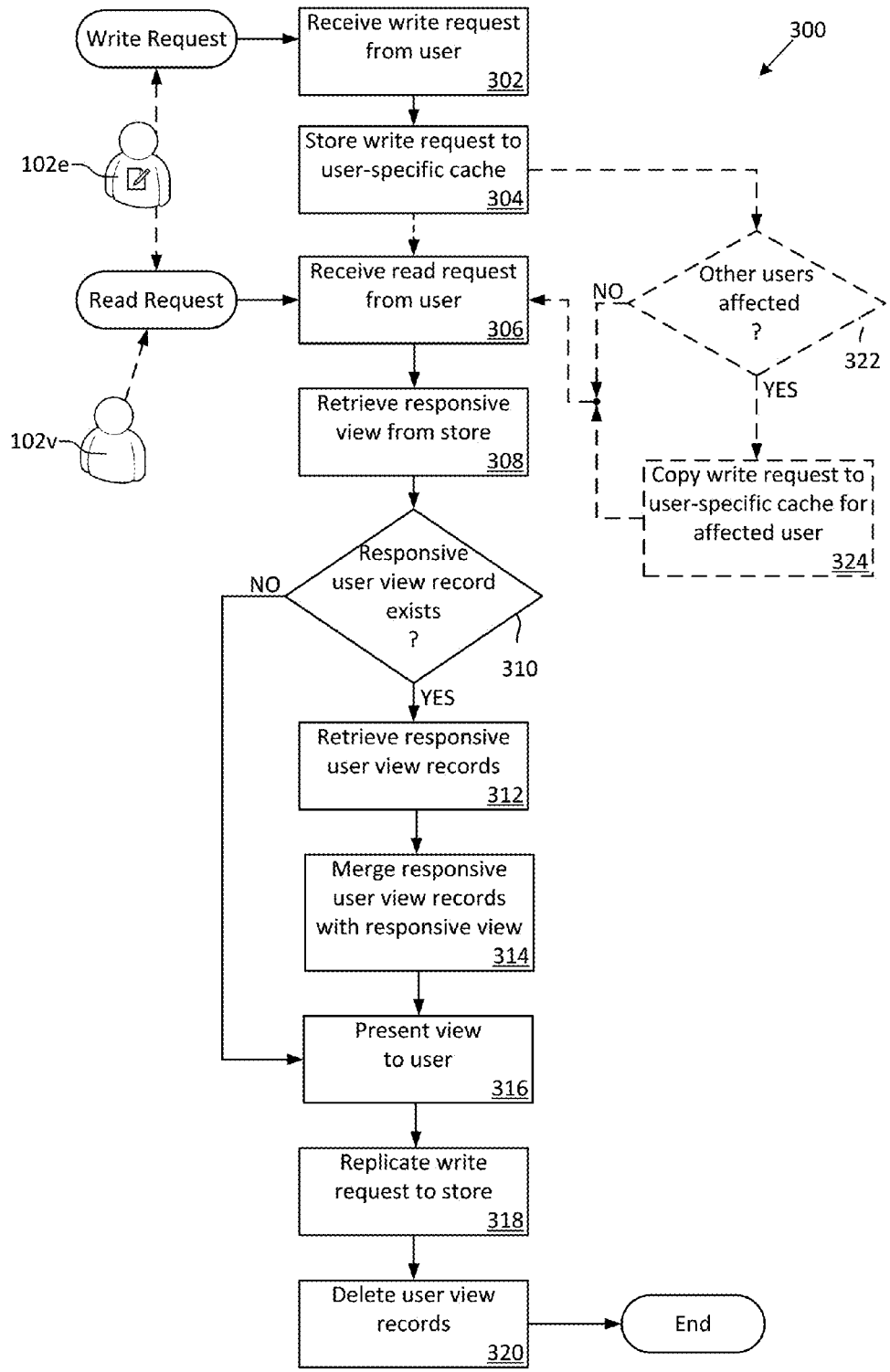
FIG. 3 is a high-level flowchart of one embodiment of the consistent view method employed by the consistent user view system.

FIG. 3 is a high-level flowchart of one embodiment of the consistent view method employed by the consistent user view system. The consistent view method 300 begins with a document write operation 302 where a write request 112 is received. The document write operation may calculate key values for the write request 112. The key values may include a partition key and a row key. The partition key identifies the partition to which the document is assigned. The row key is a unique record identifier. In various embodiments, the row key is the document identifier appended with the version of the record. The document write operation may also store the write request 112 as a history record and/or a run record in the journal 116 using the key values. More specifically, the write request 112 is written to the journal 116 of the partition identified by the partition key.

An update user cache operation 304 stores the write request 112 or a user view record based on the write request 112 in a user-specific partition 140 (i.e., cache). The user-specific partition 140 may be identified based on a user identifier included in the write request 112. For example, the write request 112 may be matched with the user-specific partition 140 using a key value corresponding to the user identifier in the write request 112. New user-specific partitions may be created as necessary or existing user-specific partitions may be added to when users submit write requests 112. User-specific partitions may be deleted when empty or flushed or trimmed as run records are fully applied to the store 118.

A read request receipt operation 306 accepts read requests 114 from users. A view retrieval operation 308 obtains the view responsive to the read request from the appropriate partition of the store 118. The read request 114 may be received from a user who recently submitted a write request 112 (i.e., an editor) or a user who has not recently submitted a write request 112 (i.e., a viewer).

A user cache check operation 310 determines if a user-specific partition 140 exists for the user who submitted the read request 114 and, if so, whether the user-specific partition 140 contains any user view records responsive to the read request 114. The user-specific partition 140 may be identified based on a user identifier included in the read request 114. For example, the read request 114 may be matched with the user-specific partition 140 using a key value corresponding to the user identifier in the read request 114. If a responsive user view record is located in the user-specific partition, a user view record retrieval operation 312 obtains the user view record responsive to the read request 114 from the user-specific partition 140 of the user cache. A merge operation 314 applies the changes reflected in the retrieved user view record to the responsive view to create an updated view for presentation to the editor. If no responsive user view record exists, the view retrieved from the store 118 is not modified.

A view operation 316 presents the responsive view to the user. The responsive view may simply be the view returned from the store 118 if responsive user view records were not located or may be the synchronized view composed of the view returned from the store 118 with the responsive user view record applied.

A propagation operation 318 applies the write request 112 to the store 118. Various embodiments of the propagation operation act on each write request 112 as it is received or each run record as it is created. Embodiments of the consistent user view system 100 retry the propagation operation based on the occurrence of events or on a schedule or periodic basis until application is successful to provide eventual consistency. An optional delete operation 320 flushes the user-specific partition 140 or deletes or trims the user view record from the user-specific partition 140 upon successful completion of the propagation operation to free up the associated resources.

The operations described above provide consistent views for the editor of a document. The method may optionally provide consistent views to any user affected by a pending edit to a document. Optional operations are represented using broken lines. Following the update user cache operation 304 for the editor, an affected user determination 322 identifies other users affected by the change (e.g., other users viewing the document). The affected user determination may be implemented by querying a set of read history records indicating users who have accessed a particular document. Such read records may be organized by the document identifier and be view independent (i.e., querying the read history records does not require the query to span multiple view partitions).

For each affected user identified, an update affected user cache operation 324, adds the pending edit to the user-specific partition 140 associated with the user who submitted the read request 114. In various embodiments, the pending edit is copied from the journal 116 to the user cache 136. The method may then continue with the read request receipt operation 306.

The subject matter of this application may be practiced in a variety of embodiments as systems, devices, and other articles of manufacture or as methods. Embodiments may be implemented as hardware, software, computer readable media, or a combination thereof. The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
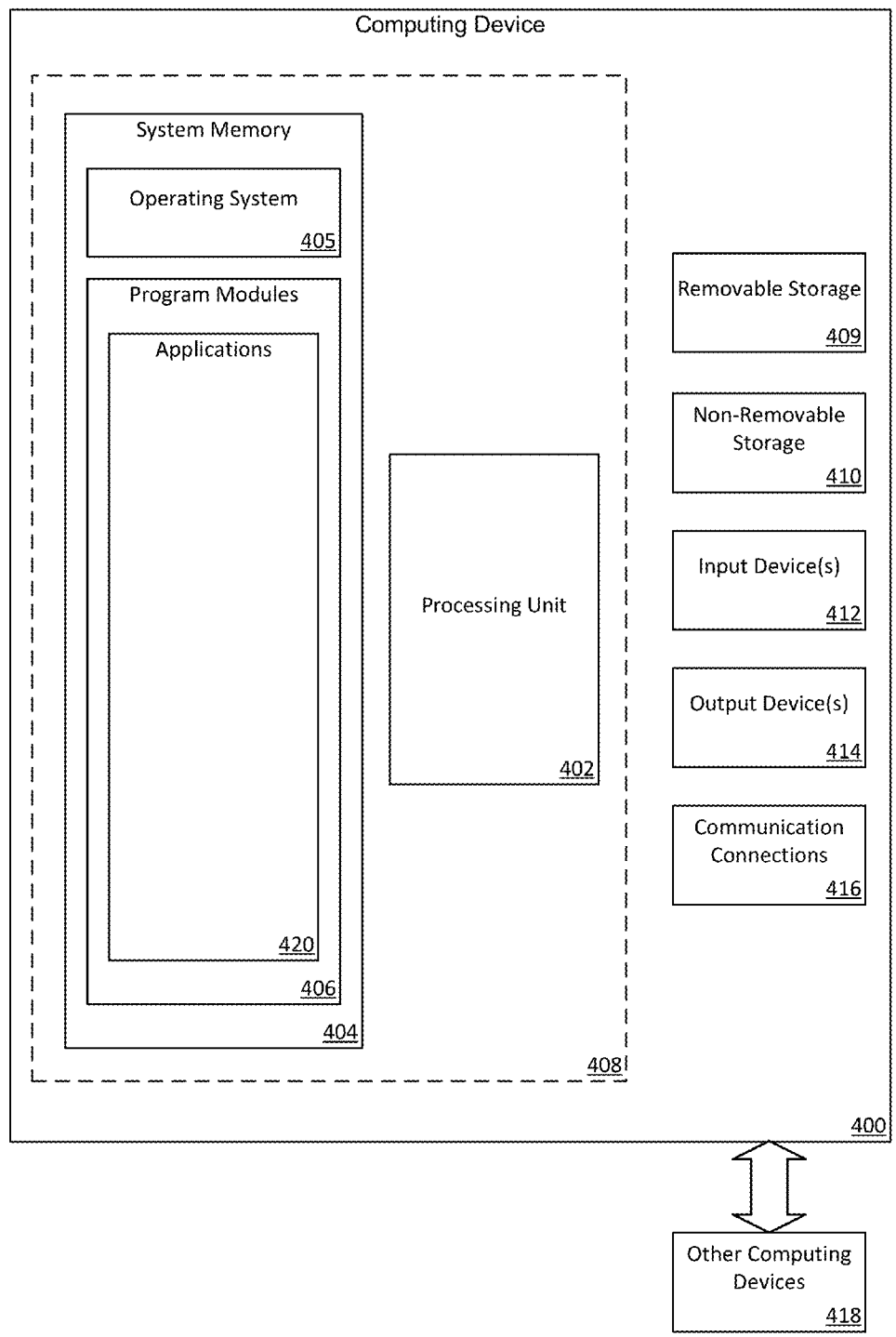
FIG. 4 is a block diagram illustrating one embodiment of the physical components of a computing device with which embodiments of the present invention may be practiced.

FIGS. 4 and 5 and the associated descriptions provide a discussion of a variety of operating environments in which embodiments of the invention may be practiced. However, the devices and systems illustrated and discussed are for purposes of example and illustration and are not limiting of a vast number of computing device configurations that may be utilized for practicing embodiments of the invention described above.

FIG. 4 is a block diagram illustrating physical components (i.e., hardware) of a computing device 400 with which embodiments of the invention may be practiced. The computing device components described below may be suitable for embodying computing devices including, but not limited to, a personal computer, a tablet computer, a surface computer, and a smart phone, or any other computing device discussed herein. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more program modules 406 suitable for running software applications 420, such as components of the consistent user view system 100. For example, the operating system 405 may be suitable for controlling the operation of the computing device 400. Furthermore, embodiments of the invention may be practiced in conjunction with a graphics library, other operating systems, or any other application program and is not limited to any particular application or system. This basic configuration is illustrated by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated by a removable storage device 409 and a non-removable storage device 410.

As stated above, a number of program modules and data files may be stored in the system memory 404. While executing on the processing unit 402, the software applications 420 may perform processes including, but not limited to, one or more of the stages of the consistent view method 300. Other program modules that may be used in accordance with embodiments of the present invention may include electronic mail and contacts applications, word processing applications, spreadsheet applications, database applications, slide presentation applications, drawing applications, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the illustrated components may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein with respect to the software applications 420 may be operated via application-specific logic integrated with other components of the computing device 400 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 400 may also have one or more input device(s) 412 such as a keyboard, a mouse, a pen, a sound input device, a touch input device, etc. The output device(s) 414 such as a display, speakers, a printer, etc. may also be included. The aforementioned devices are examples and others may be used. The computing device 400 may include one or more communication connections 416 allowing communications with other computing devices 418. Examples of suitable communication connections 416 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all examples of computer storage media (i.e., memory storage). Computer storage media may include random access memory (RAM), read only memory (ROM), electrically erasable read-only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400.

Figure 5A:
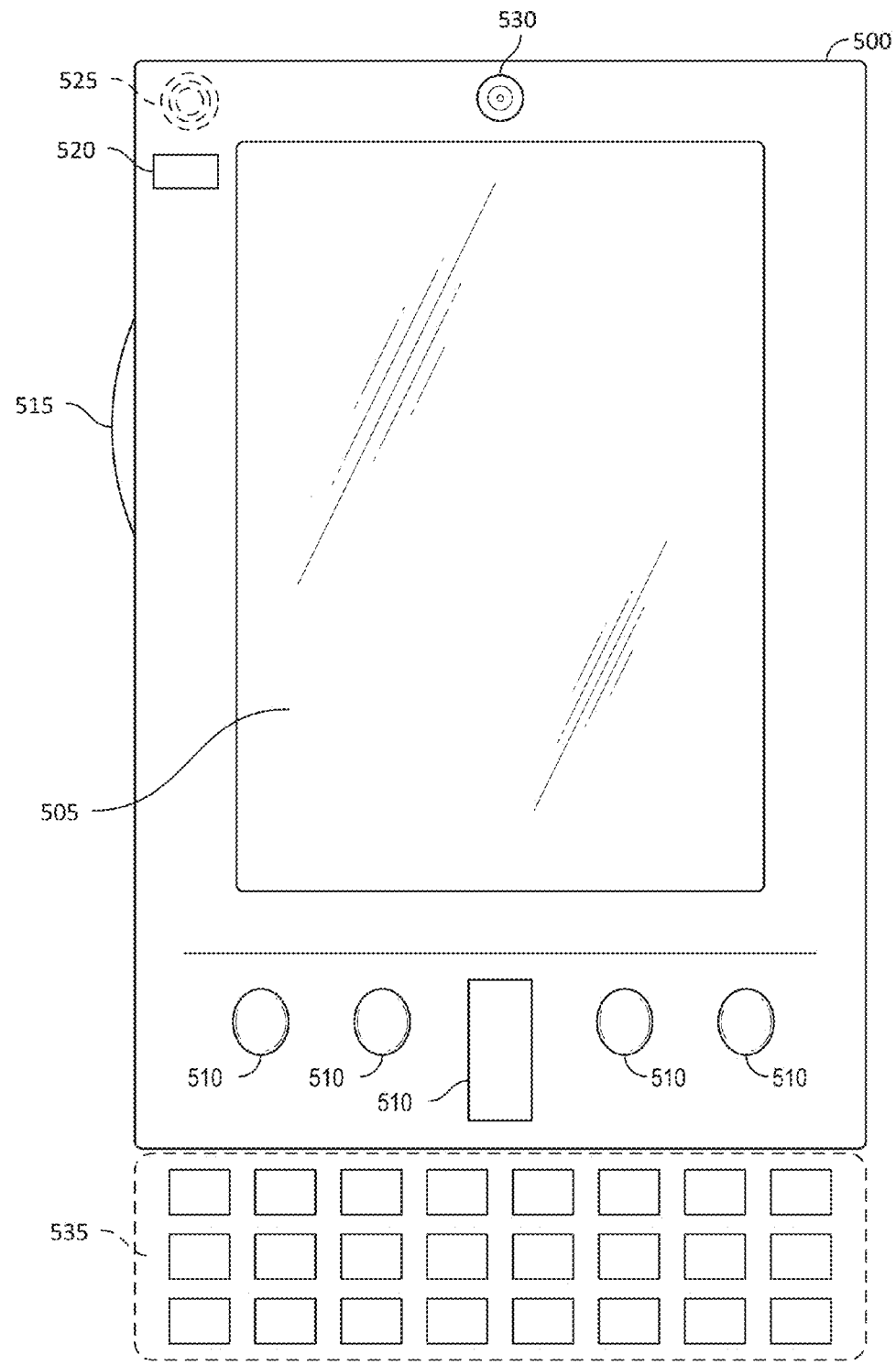
FIGS. 5A and 5B are simplified block diagrams of a mobile computing device with which embodiments of the present invention may be practiced.
Figure 5B:
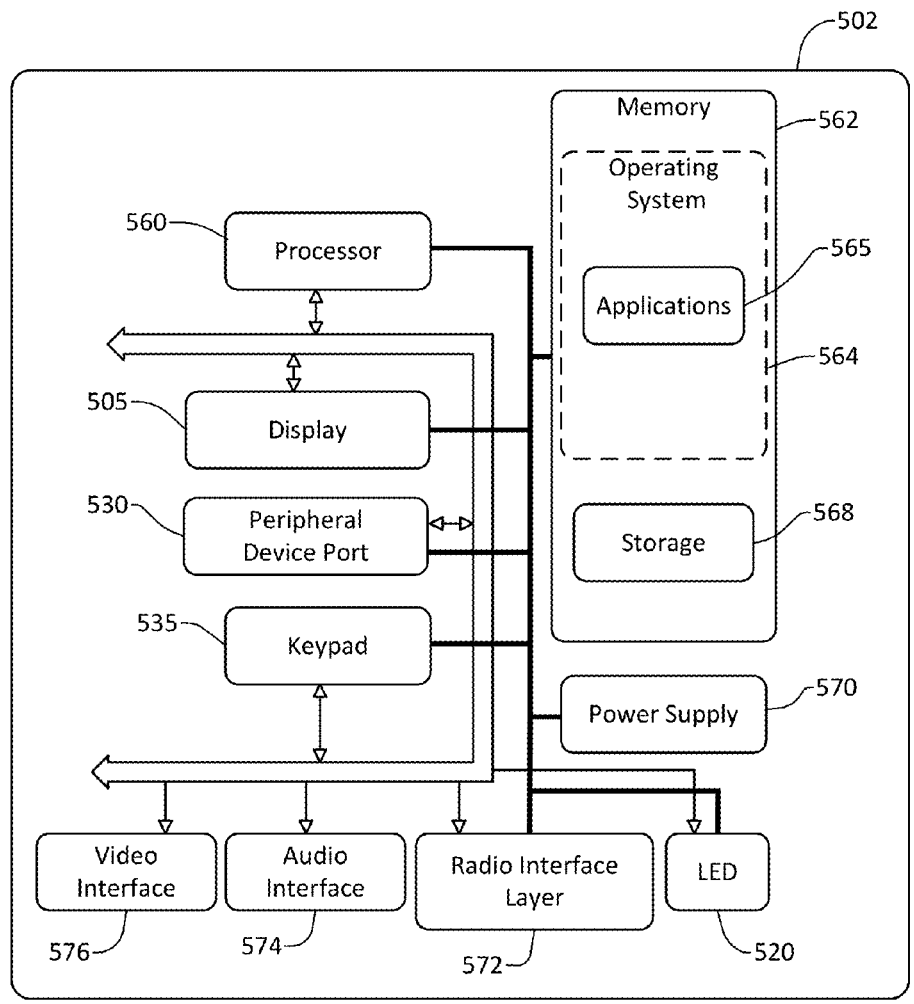

FIGS. 5A and 5B illustrate a mobile computing device 500 with which embodiments of the invention may be practiced. Examples of suitable mobile computing devices include, but are not limited to, a mobile telephone, a smart phone, a tablet computer, a surface computer, and a laptop computer. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative embodiments, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface, a visual indicator 520 (e.g., a light emitting diode), and/or an audio transducer 525 (e.g., a speaker). In some embodiments, the mobile computing device 500 incorporates a vibration transducer for providing the user with tactile feedback. In yet another embodiment, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one embodiment of a mobile computing device. That is, the mobile computing device 500 can incorporate a system (i.e., an architecture) 502 to implement some embodiments. In one embodiment, the system 502 is implemented as a smart phone capable of running one or more applications (e.g., browsers, e-mail clients, notes, contact managers, messaging clients, games, and media clients/players). In some embodiments, the system 502 is integrated as a computing device, such as an integrated personal digital assistant (PDA) and wireless phone.

One or more application programs 565 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 565 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500, including the software applications described herein.

The system 502 has a power supply 570, which may be implemented as one or more batteries. The power supply 570 might further include an external power source, such as an AC adapter or a powered docking cradle that supplements or recharges the batteries.

The system 502 may also include a radio 572 that performs the function of transmitting and receiving radio frequency communications. The radio 572 facilitates wireless connectivity between the system 502 and the outside world via a communications carrier or service provider. Transmissions to and from the radio 572 are conducted under control of the operating system 564. In other words, communications received by the radio 572 may be disseminated to the application programs 565 via the operating system 564, and vice versa.

The visual indicator 520 may be used to provide visual notifications, and/or an audio interface 574 may be used for producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present invention, the microphone may also serve as an audio sensor to facilitate control of notifications, as will be described below. The system 502 may further include a video interface 576 that enables an operation of an on-board camera 530 to record still images, video streams, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

The description and illustration of one or more embodiments provided in this application are intended to provide a complete thorough and complete disclosure the full scope of the subject matter to those skilled in the art and not intended to limit or restrict the scope of the invention as claimed in any way. The embodiments, examples, and details provided in this application are considered sufficient to convey possession and enable those skilled in the art to practice the best mode of claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method, comprising:
   receiving a read request submitted by a user, the read request associated with a source document stored in a storage unit;
   retrieving, responsive to the read request, the source document from the storage unit;
   retrieving a user view record responsive to the read request from a user-specific partition of a cloud storage resource, wherein the user view record is associated with the user and represents a pending write request to the source document;
   generating an updated responsive view of the source document by merging the pending write request associated with the user view record with the source document;
   causing presentation of the updated responsive view of the source document;
   subsequent to causing the presentation of the updated responsive view, merging the pending write request with the source document stored in the storage unit to produce an updated source document; and
   in response to producing the updated source document, deleting the user view record associated with the write request from the user-specific partition of the cloud storage resource.

2. The method of claim 1, further comprising providing an acknowledgement acknowledging receipt of the write request after the write request has been stored in the user-specific partition, the write request comprising one or more edits to the source document.

3. The method of claim 1, wherein:
   the read request comprises a first read request;
   the user-specific partition of the cloud storage resource comprises a first user-specific partition of the cloud storage resource;
   the pending write request comprises a first pending write request;
   the user comprises a first user;
   the user view record comprises a first user view record; and
   the method further comprises:
      receiving a second read request submitted by a second user, wherein the second read request is associated with the source document;
      responsive to the second read request and based on a determination that a second user-specific partition in the cloud storage resource associated with the second user does not store a second user view record that represents a second pending write request to the source document submitted by the second user, causing presentation of a responsive user view of the source document that is associated with the second user.

4. The method of claim 1, wherein:
   the read request comprises a first read request;
   the user-specific partition of the cloud storage resource comprises a first user-specific partition of the cloud storage resource;
   the user comprises a first user;
   the user view record comprises a first user view record;
   the updated responsive view of the source document comprises a first updated responsive view of the source document; and
   the method further comprises:
      receiving a second read request submitted by a second user, wherein the second read request is associated with source document;
      responsive to the second read request and while the write request associated with the first user is pending, storing a second user view record in a second user-specific partition of the cloud storage resource associated with the second user, wherein the second user view record is associated with the second user and represents the pending write request to the source document;
      generating a second updated responsive view of the source document by merging the pending write request associated with the second user view record with the source document; and
      causing presentation of the second updated responsive view of the source document.

5. The method of claim 1, further comprising:
   receiving a query directed to the user-specific partition for an edit applicable to the source document from a client device caching the source document; and
   sending the edit to the client device so the client device may update the cached source document with the edit to the source document.

6. The method of claim 1, wherein:
   the storage unit comprises a first storage unit; and
   the method further comprises:
      receiving the write request submitted by the user, the write request comprising one or more user edits to the source document; and
      storing a run record associated with the write request in a second storage unit.

7. A system comprising:
   a first storage system storing and servicing write requests;
   a second storage system storing documents and servicing read requests;
   a user-specific partition of a cache associated with a user; and
   a computing device having a processor and a memory, the computing device operable to:
      store, in the first storage system, a write request submitted by the user and comprising an edit to a document stored in the second storage system;
      store a user view record associated with the write request in the user-specific partition of the cache;
      receive a read request submitted by the user, wherein the read request is associated with the document;
      retrieve, responsive to the read request, the document from the second storage system;
      retrieve the user view record responsive to the read request from the user-specific partition of the cache;

generate an updated responsive view of the document by merging the write request associated with the user view record with the document;

cause presentation of the updated responsive view of the document;

subsequent to causing the presentation of the updated responsive view, merge the write request with the document stored in the second storage system to produce an updated document; and in response to producing the updated document, delete the user view record from the user-specific partition of the cache.

8. The system of claim 7, wherein the computing device is further operable to acknowledge receipt of the write request after storing the user view record in the user-specific partition of the cache.

9. The system of claim 7, wherein the computing device is further operable to provide only the document in responses to read requests submitted by other users.

10. The system of claim 7, wherein the computing device is further operable to assign a first version number to the write request stored in the first storage system that is different from a second version number of the document.

11. The system of claim 10, wherein the computing device is further operable to use the first version number as the version number of the document when responding to the read request from the user.

12. The system of claim 7, wherein:
the read request comprises a first read request;
the user-specific partition of the cache comprises a first user-specific partition of the cache;
the user view record comprises a first user view record;
the user comprises a first user; and
wherein the computing device is operable to:
receive, from a second user, a second read request associated with the document; and
store a second user view record associated with the write request in a second user-specific partition of the cache associated with the second user.

13. The system of claim 12, wherein:
the updated responsive view of the document comprises a first updated responsive view of the document; and
the computing device is operable to:
generate a second updated responsive view of the document by merging the write request associated with the second user view record with the document; and
cause presentation of the second updated responsive view of the document.

14. A method, comprising:
receiving a first read request submitted by a first user, the first read request associated with a document;
retrieving, responsive to the first read request, the document from a storage system;
retrieving a first user view record responsive to the first read request from a first user-specific partition of a cache, wherein the first user view record is associated with the first user and represents a first pending write request to the document submitted by the first user;

generating an updated responsive view of the document by merging the first pending write request associated with the first user view record with the document;

causing presentation of the updated responsive view of the document;

subsequent to causing the presentation of the updated responsive view, merging the first pending write request with the document stored in the storage system to produce an updated document;

prior to merging the first pending write request with the document, receiving a second read request submitted by a second user, the second read request associated with the document; and responsive to the second read request and based on a determination that a second user-specific partition in the cache does not store a second user view record that represents a second pending write request to the document submitted by the second user, causing presentation of a responsive user view of the document that is associated with the second user.

15. The method of claim 14, further comprising in response to producing the updated document, deleting the first user view record from the first user-specific partition of the cache.

16. The method of claim 14, wherein:
the updated responsive view of the source document comprises a first updated responsive view of the document; and
the method further comprises:
prior to merging the first pending write request with the document, receiving a third read request submitted by a third user, wherein the third read request is associated with document;
responsive to the third read request, storing a third user view record in a third user-specific partition of the cache associated with the third user, wherein the third user view record is associated with the third user and represents the pending first write request to the document;
generating a second updated responsive view of the document by merging the pending first write request associated with the third user view record with the document; and
causing presentation of the second updated responsive view of the document.

17. The method of claim 14, further comprising providing an acknowledgement acknowledging receipt of the first write request after the first write request is stored in the first user-specific partition of the cache.

18. The method of claim 14, wherein:
the storage system comprises a first storage system; and
the method further comprises:
receiving the first write request submitted by the first user, the first write request comprising one or more edits to the document; and
storing a run record associated with the first write request in a second storage system.

* * * * *